G. F. JOHNSON.
TRACTOR WHEEL.
APPLICATION FILED NOV. 11, 1916.
1,228,024.
Patented May 29, 1917.
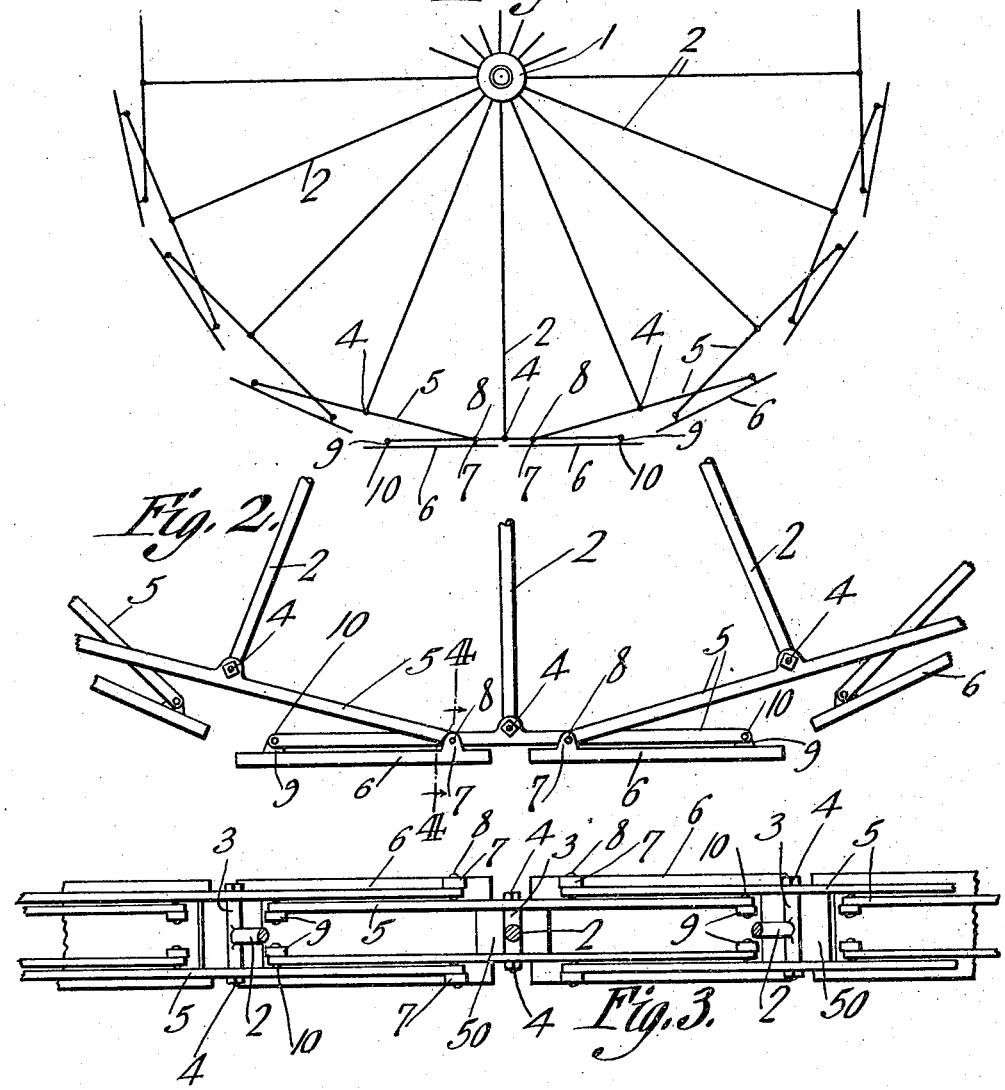
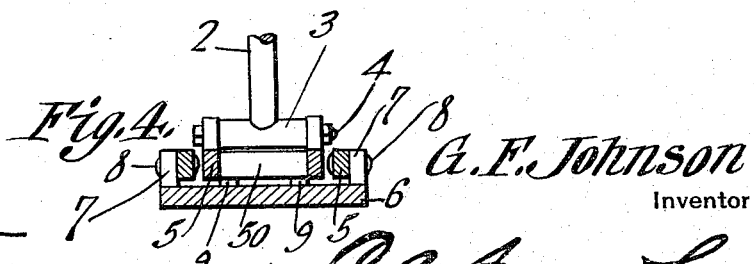
Witnesses
G. F. Johnson
Inventor
Attorneys

UNITED STATES PATENT OFFICE.

GEORGE F. JOHNSON, OF MAPLE CITY, KANSAS.

TRACTOR-WHEEL.

1,228,024.  Specification of Letters Patent. Patented May 29, 1917.

Application filed November 11, 1916. Serial No. 130,851.

*To all whom it may concern:*

Be it known that I, GEORGE F. JOHNSON, a citizen of the United States, residing at Maple City, in the county of Cowley and State of Kansas, have invented a new and useful Tractor-Wheel, of which the following is a specification.

The device forming the subject matter of this application is a tractor wheel, and the invention aims to provide a wheel of this kind having a novel tread surface which will afford great tractive power.

Another object of the invention is to provide novel means for mounting the treads of the wheel.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is a diagram illustrating in side elevation, a portion of a wheel constructed in accordance with the present invention;

Fig. 2 is a fragmental side elevation showing a portion of the wheel;

Fig. 3 is a cross section looking at the inner surface of the tread portion of the wheel; and Fig. 4 is a cross section on the line 4—4 of Fig. 2.

In the accompanying drawings, the numeral 1 designates the hub of a wheel from which radiate spokes 2. At their outer ends, the spokes 2 are provided with transverse sockets 3. Mounted in the sockets 3 are fulcrum members 4 supporting levers comprising side bars 5 and spacing blocks 50, the side bars 5 being fulcrumed intermediate their ends on the parts 4. Treads 6 are shown. At their inner ends, the treads 6 are provided with ears 7 carrying pivot elements 8 engaged with the side bars 5 of one spoke. At their outer ends, the treads 6 are provided with ears 9 carrying pivot elements 10 engaged with the outer ends of the bars 5 of an adjoining spoke.

In practical operation, the treads 6 will coöperate to present a large surface to the ground, giving the device great tractive power. The construction, further, is such that the ground will not be packed unduly by the treads, and as a consequence, a traction wheel constructed in accordance with the present invention will operate readily over loose or muddy soil.

Having thus described the invention, what is claimed is:—

1. A traction wheel embodying spokes; levers fulcrumed intermediate their ends on the spokes; and treads, the inner ends of the treads being pivoted to the ends of the levers of spaced spokes, and the outer ends of the treads being pivoted to the lever of a spoke which is located between the first-specified spokes.

2. In a device of the class described, a traction wheel; a set of levers fulcrumed intermediate their ends on the wheel and extended circumferentially of the wheel; treads having their inner ends pivoted to the ends of the spaced levers of the set, and the outer ends of the treads being pivoted to the ends of a lever of the set which is fulcrumed between the spaced levers.

In testimony that I claim the foregoing as my own, I have hereto affixed my signature in the presence of two witnesses.

GEORGE F. JOHNSON.

Witnesses:
  R. A. BROWN.
  JOHN R. NORTON.

Copies of this patent may be obtained for five cents each, by addressing the "Commissioner of Patents, Washington, D. C."